UNITED STATES PATENT OFFICE.

GRANT RICHIE, OF BROOKLYN, NEW YORK, ASSIGNOR TO FULTON CHEMICAL COMPANY, A CORPORATION OF NEW YORK.

COFFEE-PURIFIER.

982,877.  Specification of Letters Patent.  Patented Jan. 31, 1911.

No Drawing.  Application filed April 16, 1909.  Serial No. 490,402.

*To all whom it may concern:*

Be it known that I, GRANT RICHIE, a citizen of the United States, residing at Brooklyn, in the county of Kings and State of New York, have invented certain new and useful Improvements in Coffee-Purifiers, of which the following is a specification.

My invention relates to that class of compounds used for clarifying or improving coffee and similar decoctions.

The primary object of the invention is to provide a compound which will effectively clarify the coffee, and at the same time improve its flavor.

A further object is to prepare and put up such a compound in a convenient, compact, and attractive form.

To these ends I provide an improved compound containing, as its essential ingredients, the following substances:—(1) gelatin, (2) sugar, (3) cocoa-shells.

More specifically, and in order to attain the best results, I preferably employ the exact materials named below, and in the following proportions, (by weight):—

(1) Brazilian isinglass ___ 1 part.
(2) Powdered cane sugar_10 parts.
(3) Crushed cocoa-shells _ 4 parts.

In preparing the compound, I preferably first grind the isinglass into a fine powder, and after thoroughly crushing the cocoa-shells, mix the three powdered ingredients intimately together. I next add a suitable binder, such as sugar of milk or lactose, till the mass is reduced to a plastic condition, and then mold or compress the compound into tablets or pellets of suitable size and shape.

Russian isinglass may, in some instances, be employed if desired, instead of the Brazilian variety.

It will be therefore observed that two different kinds of sugar are used in my improved tablet, first, the refined powdered cane sugar, and second, the lactose or sugar of milk. A tablet containing the cane sugar only would not be properly bound together, while a tablet containing only sugar of milk would be too hard and insoluble for successful use. Sugar of milk is particularly desirable as a binder because of the fact that it will not cloud the coffee, as will certain other binders.

When a tablet of my improved compound is dropped into a pot of coffee, the binder dissolves, and the ingredients are distributed through the liquid. The sugar and isinglass dissolve, and form a thin gelatin-like mass which diffuses itself throughout the coffee, and has the mechanical property of collecting and holding the fine particles which are in suspension. The specific gravity of the mass thus becoming greater, it gradually settles to the bottom, carrying with it the entrained particles. Moreover, the isinglass appears to have an affinity for the tannin in the coffee, and by absorbing it, reduces the amount of tannin taken into the system by the coffee drinker. The cocoa-shell has the property of apparently strengthening the coffee, while at the same time, it seems to take off the "sharp edge" and improve the flavor. The cocoa shell, besides improving the flavor of the coffee, performs the important function of mechanically strengthening the tablet, the shreds of shell assisting the sugar of milk in binding the materials into a compact mass.

It will thus be seen that I have provided, in one compact and marketable article, an improved combined coffee clarifier and purifier, and it is thought the numerous advantages of my invention will be readily appreciated by those skilled in the art.

What I claim is:—

1. A compound for purifying and improving the flavor of coffee, comprising Brazilian isinglass, sugar and pulverized cocoa-shells.

2. A coffee purifier comprising a tablet containing a gelatin, sugar, and cocoa-shells, and a binder composed of sugar of milk.

3. A coffee purifier comprising a tablet formed from a mixture of isinglass, powdered cane sugar and pulverized cocoa shells, the materials being held together by a binder consisting of sugar of milk.

In testimony whereof I affix my signature, in presence of two witnesses.

GRANT RICHIE.

Witnesses:
FRANK WYMAN, 2nd,
NATHANIEL L. FOSTER.